(No Model.)
A. EGGERS.
MIXING AND STRAINING CUP.
No. 251,773. Patented Jan. 3, 1882.
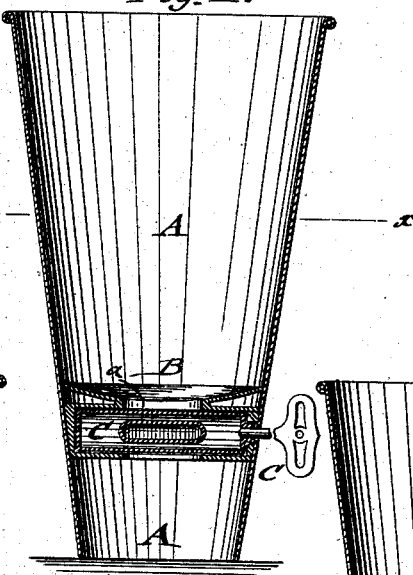
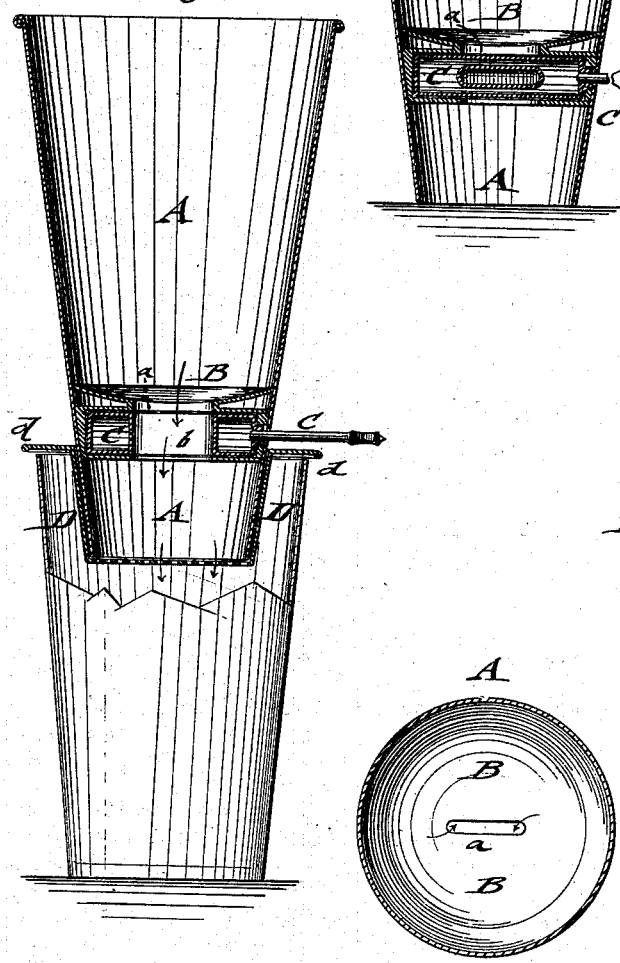
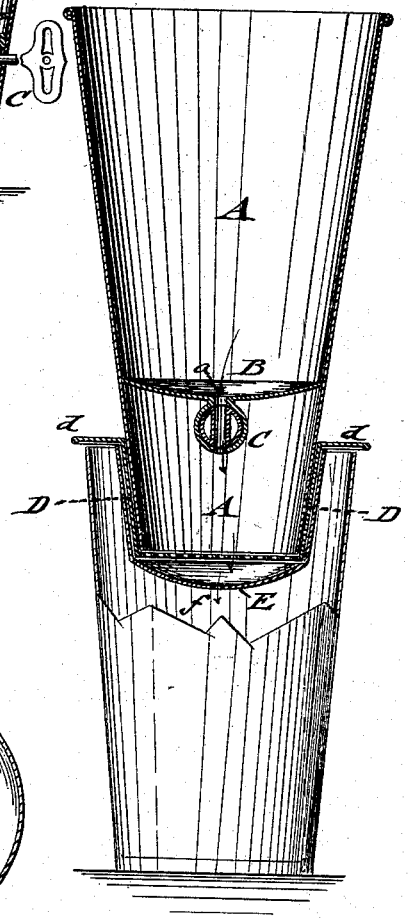
WITNESSES:
Carl Kain
Jol. N. Rosenbaum.
INVENTOR
Anton Eggers
BY Paul Goepel.
ATTORNEY

UNITED STATES PATENT OFFICE.

ANTON EGGERS, OF NEW YORK, N. Y.

MIXING AND STRAINING CUP.

SPECIFICATION forming part of Letters Patent No. 251,773, dated January 3, 1882.

Application filed September 27, 1881. (No model.)

*To all whom it may concern:*

Be it known that I, ANTON EGGERS, of the city, county, and State of New York, have invented certain new and useful Improvements in Mixing and Straining Cups, of which the following is a specification.

This invention has reference to an improved cup for mixing and straining drinks, so that bar-keepers are enabled to make them in a quicker and more convenient manner than by the method heretofore in use, in which two separate cups are employed, one for shaking up the drinks with lumps of ice and the other for straining the same into the glass.

The invention consists of a mixing and straining cup having a centrally slotted or perforated bottom, and below the slots a stop-cock or valve which registers with the openings or slots of the bottom, so as to open or close the same. A flanged straining-cup is fitted to the lower part of the conical vessel below the valve, so as to admit the straining off as soon as the contents have been properly mixed. An additional cup with a small center perforation in its bottom is fitted over the straining-cup, to be used for absinthe.

In the accompanying drawings, Figures 1, 2, and 3 represent vertical central sections of my improved mixing and straining cup for drinks, showing respectively the cup without a strainer, with a strainer, and with a strainer and absinthe-cup; and Fig. 4 is a horizontal section of the cup on line $x\,x$, Fig. 1.

Similar letters of reference indicate corresponding parts.

Referring to the drawings, A represents a mixing-cup of conical shape, and of suitable size to receive the ingredients required for compounding the drinks, also the lumps of ice with which the ingredients are usually shaken. The cup A is preferably made of silver-plated white metal, being open at the upper and lower ends, and provided at some distance above the lower end with a fixed concaved or dishing bottom, B, which is arranged with a central slot, $a$, or with perforations placed in line with each other, as desired.

Below the bottom B is arranged a valve or stop-cock, C, the slotted opening $b$ of which registers with the slot or perforations $a$ of the bottom B when the stop-cock C is turned so that its opening is vertically in line with the slot $a$, as shown in Fig. 2. When not in line therewith the solid portion of the valve closes the opening $a$ of the bottom B and prevents the escape of the liquid in the cup.

To the lower part of the mixing-cup A is fitted a draining-cup, D, which is provided at its upper end with a flange, $d$, of sufficient size that the cap may be supported thereby on the rims of the glasses or goblets whenever the contents are to be strained off. The bottom part, $e$, of the straining-cup is perforated or made of wire-gauze.

In connection with the straining-cup is used a third detachable cup, E, which fits over the strainer, as shown in Fig. 3, and which has a small central discharge-opening, $f$, in its bottom, this cup being used for dispensing absinthe after it has been shaken with the lumps of ice in the cup A.

The mixing and straining cup is used in the following manner: The lumps of ice and the ingredients composing the drink are placed into a tumbler or cup, upon which the mixing-cup is placed in inverted position with the stop-cock closed. The contents are mixed by shaking both the tumbler and mixing-cup while holding them together. When the ingredients are properly mixed the straining-cup is put on and placed with the mixing-cup on the glass. The stop-cock is then opened and the contents are drawn off into the glass. When absinthe is dispensed the small additional cup with its center aperture is placed in position over the straining-cup.

I am aware that a combined mixer and strainer that is formed of a mixing-cup with a strainer at the bottom and a valve by which said strainer is opened or closed has been patented heretofore, and I therefore do not claim this, broadly. The disadvantage of this mixing and straining vessel has been, however, that the attendant had to hold the vessel in one hand and the valve with the other while the liquid is drawn off, which is connected with great inconvenience, as it requires the continuous attention of the bar-keeper. This I have successfully avoided by separating the straining-cup from the mixing-cup and providing it with a flange for placing it in position on the glass, so that the attendant can place the mixer and strainer in position thereon, and by opening the valve cause the liquid portion to be drawn off. This applies also to the additional cup, which is used for absinthe and similar purposes.

Having thus described my invention, I claim as new and desire to secure by Letters Patent—

1. The combination of a mixing-cup, A, having a slotted bottom, B, and a valve or stop-cock, C, below the bottom, with a detachable straining-cup, D, having a flange, d, at its upper edge, said straining-cup being fitted to the lower part of the mixing-cup, substantially as set forth.

2. The combination of a mixing-cup, A, having a slotted bottom, B, and a valve or stop-cock, C, below the same, of a detachable straining-cup, D, having a flange, d, at the upper edge, and of a detachable auxiliary cup, E, having a central bottom perforation, f, the cup E being fitted over the straining-cup D, substantially as set forth.

In testimony that I claim the foregoing as my invention I have signed my name, in presence of two witnesses, this 16th day of September, 1881.

ANTON EGGERS.

Witnesses:
PAUL GOEPEL,
CARL KARP.